Nov. 8, 1932. A. B. PEFFER 1,887,138
PAN CLEANING MACHINE
Filed April 1, 1930 2 Sheets-Sheet 2
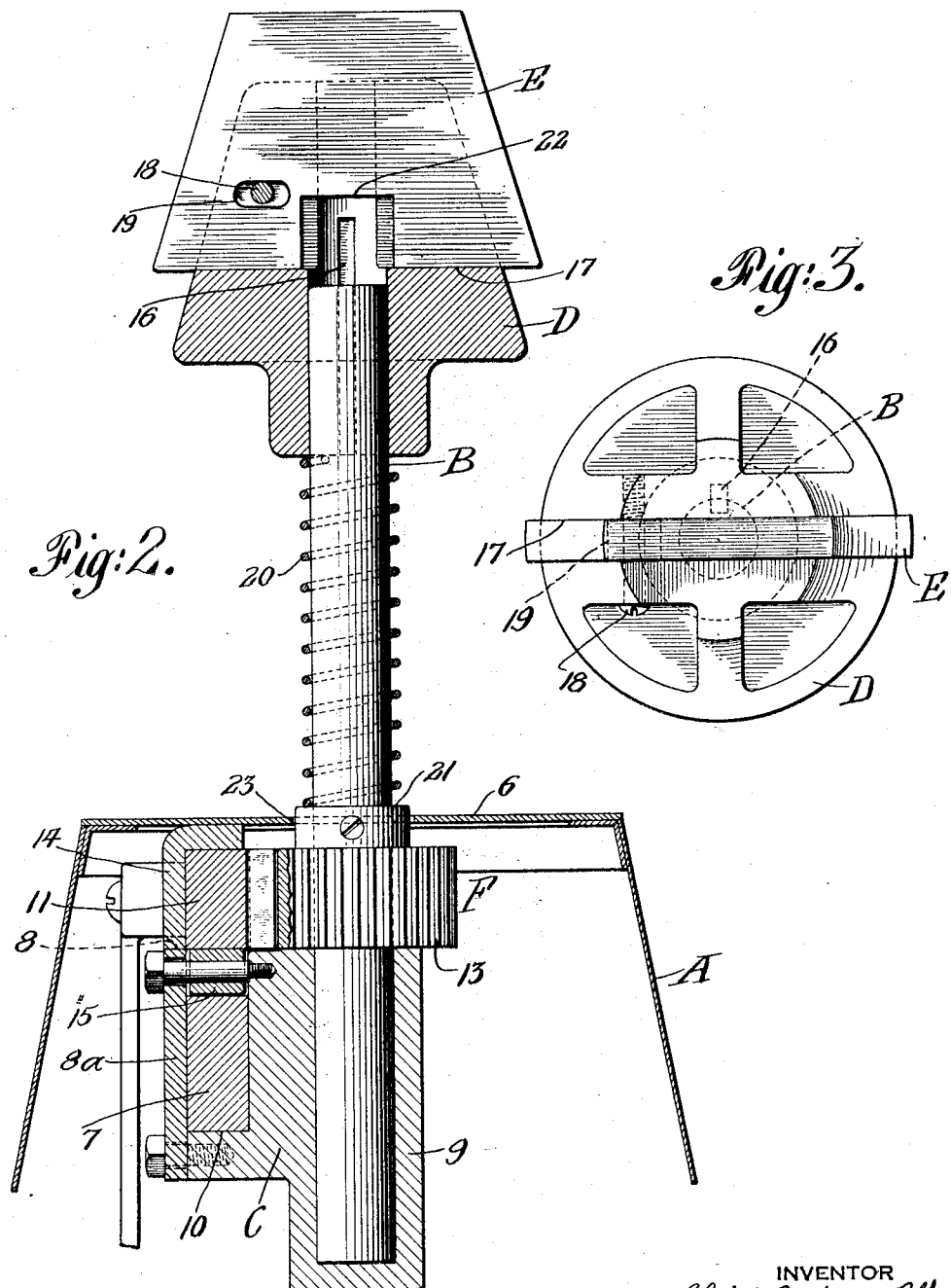

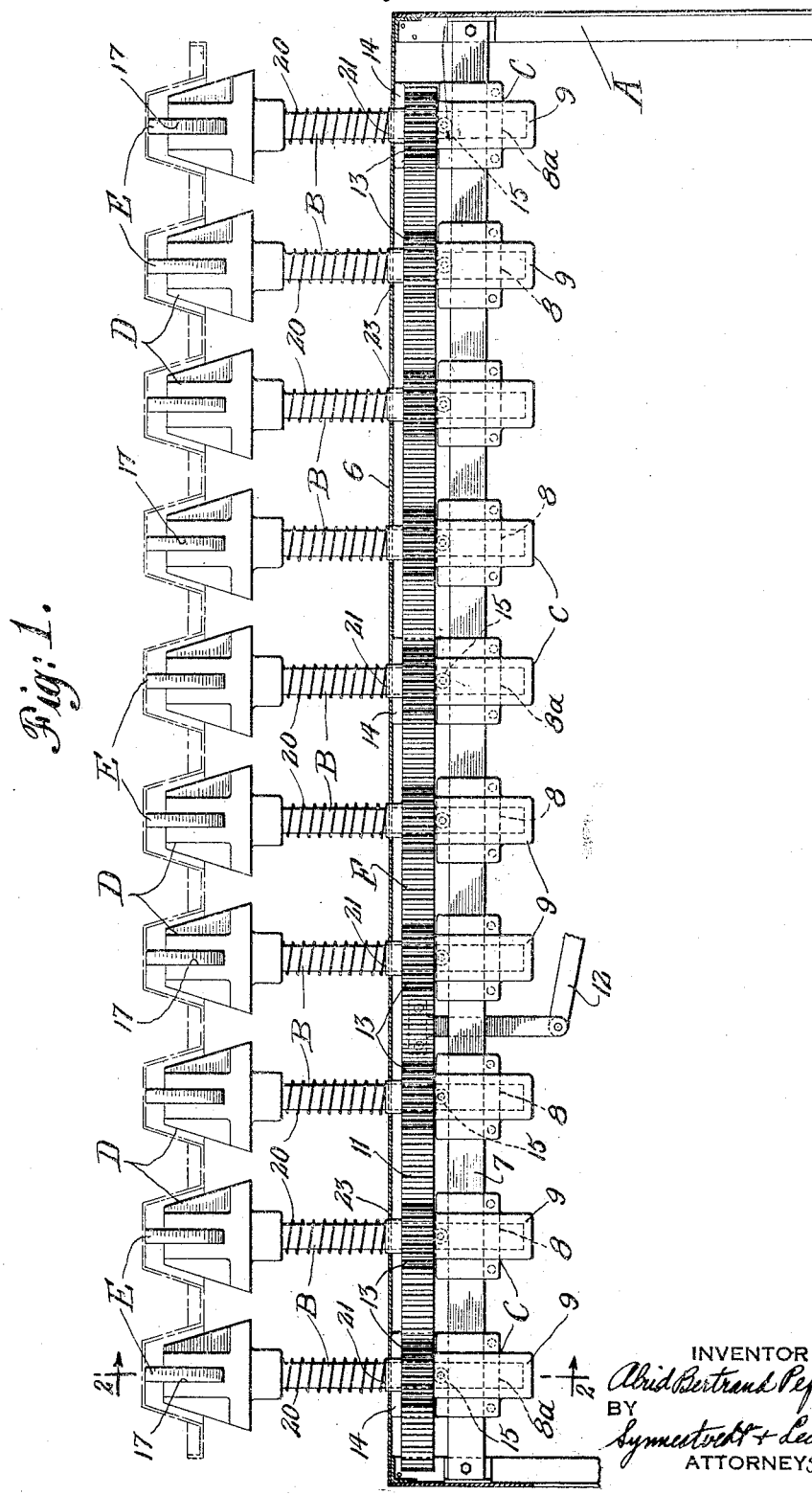

Patented Nov. 8, 1932

1,887,138

UNITED STATES PATENT OFFICE

ALRID BERTRAND PEFFER, OF PHILADELPHIA, PENNSYLVANIA, ASSIGNOR TO IMPERIAL MACHINE COMPANY, OF PHILADELPHIA, PENNSYLVANIA, A PARTNERSHIP COMPOSED OF ALRID BERTRAND PEFFER AND EMIL SCHWARTZ

PAN CLEANING MACHINE

Application filed April 1, 1930. Serial No. 440,667.

This invention relates to pan cleaning machines and is especially useful for cleaning cup cake pans having a plurality of rows of cups.

In large bakeries a great number of these pans are used and they soon become somewhat bent or buckled so that the cups of a pan become displaced or tilted. When the pans are in such condition difficulties are encountered in cleaning them by machine.

It is one of the primary objects of my invention, therefore, to provide a pan cleaning machine adapted to overcome such difficulties.

Another object of my invention resides in the provision of a pan cleaning machine which is adapted to thoroughly clean, at one time, a plurality of the cups of a cup cake pan.

A more specific object of my invention is to provide a cup cake pan cleaning machine in which a plurality of upright spindles having flexibly or resiliently mounted cleaning elements are employed.

A further object of my invention is the provision of a machine of the character described in which the cleaning element carrying members or heads and the cleaning elements are adapted to readily accommodate themselves to the position of the cups of the pan when an inverted pan is placed over the cleaning elements, so that every cup is thoroughly cleaned, whether the pans are new or old or in buckled or bent condition.

Still another object of my invention is the provision of a novel cleaning element for pan cleaning machines of the character described.

A still further object resides in the provision of floating cleaning elements in pan cleaning machines of the character described.

How the foregoing, together with such other objects and advantages as will hereinafter appear, or are incident to my invention are realized, is illustrated in preferred form in the accompanying drawings wherein—

Fig. 1 is a sectional elevation of a machine embodying my invention.

Fig. 2 is an enlarged vertical cross section through the machine taken substantially on the line 2—2 of Fig. 1; and Fig. 3 is a plan view of one of the cleaning devices which I employ.

The machine comprises in general supporting structure A having a table-like portion 6, a plurality of spaced apart spindles B, bearing members C for the spindles, cleaning element holders or heads D, cleaning elements E and mechanism for rotating the spindles indicated as a whole by the reference letter F.

The supporting structure A includes a fixed bar 7 on which the bearing members C are mounted and to which they are secured by any suitable means such as the clamping plates 8. The bearing members are provided with upright tubular portions 9 for receiving the spindles or shafts B and with recessed portions 10 for engaging the bar 7.

The mechanism F for rotating the spindles comprises a reciprocating rack bar 11 adapted to be moved backwardly and forwardly by any suitable driving mechanism such as a rotating crank having connection with the rack bar as by means of a link or rod 12. Each spindle is provided with a gear or pinion 13 adapted to mesh with the rack bar 11 whereby the spindles are rotated first in one direction and then in the opposite direction as the rack bar is reciprocated.

The rack bar may be supported and guided from the bearing members C and in this instance I have provided the clamping plates 8a of the end bearing members and an intermediate bearing member with upper portions 14 for this purpose. Supporting rollers 15 may be provided for the rack to ride on.

The cleaning elements E are in the form of flat plate-like members, preferably made of leather or similar material, which may be treated to be grease resisting, and the edges of these members are configured to the shape of the pan cups.

The holders or heads D are mounted on the spindles to rotate therewith and to be movable axially therealong as by means of a spline connection 16. Transverse slots 17 are provided in the holders for receiving the cleaning elements E and the holders are shaped similar to a cup cake, it being noted, however, that the cleaning elements project from the holders at the sides and top. The cleaning elements are mounted for free movement in the holders so that they may readily accommodate themselves to the position of the cups of the pan, which cups become displaced from their normal position through usage. In order to prevent the cleaning elements from being displaced from the holders, I provide means such as a pin or screw 18 fitting an elongated or enlarged hole 19 in the cleaning elements, the pin or screw being secured in the head.

To further insure proper seating of the cleaning elements in the cups and thorough cleaning of the cups, I provide a resilient or yieldable mounting for the holders D. In this instance the mounting is in the form of a spring 20 carried by the spindle and engaging an abutment or shoulder 21 on the spindle at one end and the holder D at its other end. As shown herein the abutment 21 is formed as part of the pinion 13. The holder D rests on the spring and since it is splined on the spindle it may be axially moved by downward pressure. A recess 22 is provided in the cleaning element to accommodate the upper portion of the spindle.

The particular machine herein illustrated is for use in cleaning cup cake pans having a plurality of rows of ten cups each, and, therefore, I employ ten spaced upright spindles arranged on centers corresponding to the centers of the cups of the pans. The table portion 6 is provided with holes 23 through which the spindles pass, the holes being just large enough to clear the portions 21 of the pinions so as to prevent crumbs and the like from falling to the mechanism below the table.

From the foregoing it will be seen that I have provided a pan cleaning machine which is peculiarly adapted to very thoroughly clean, at one time, a plurality of cups or containers, even though the cups are somewhat displaced from their original positions, by merely inverting the pan and placing the cups over the cleaning elements and then pressing down on the pan. If the cups are not all at the same level, pressure on the pan causes the heads to yield by virtue of their spring mounting, until all of the heads are brought to the same level, thus insuring proper seating of all of the cleaning elements in the cups. Should any of the cups be slightly angularly disposed or displaced from their original centers, the cleaning elements will accommodate themselves to the cups because of the freedom of movement afforded through the particular manner in which they are mounted in the holders.

Although I have referred to the plate-like members E as cleaning elements and to the members D as holders, it is to be understood that the combined holders and plate-like members may be considered as constituting the cleaning elements of the machine and, therefore, in a broad sense I have provided floating cleaning elements on the spindles through which the very desirable results above mentioned are obtained.

By employing plate-like cleaning elements, i. e., cleaning elements in the form of blades, a sort of scraping action is obtained which produces very thorough and effective cleaning of the cups.

The holders or heads may be removed and replaced by merely lifting them off the spindles and sliding others on in their stead. To remove the cleaning elements E from the heads it is only necessary to remove the pins or screws 18.

I claim:—

1. A cup cake pan cleaning machine including a plurality of rotatable spindles, a support having spaced mountings for the spindles, means for rotating the spindles, cleaning element holders resiliently mounted and splined on said spindles, and cleaning elements carried by the holders.

2. In a cup cake pan cleaning machine, the combination of a plurality of upright rotatable spindles, a supporting structure, spindle bearings carried by said structure in spaced relation, means for rotating the spindles, cleaning element holders splined on said spindles and having transverse slots, springs on said spindles for resiliently supporting said holders vertically, flat cleaning elements movably mounted in said slots, and means for preventing displacement of said elements from the holders.

3. In a cup cake pan cleaning machine the combination of a row of rotatable spindles, a head carried by each spindle to rotate therewith, and a cleaning member slidably mounted in each head and projecting from the head to engage the pan being cleaned at both sides.

4. In a cup cake pan cleaning machine the combination of a row of rotatable spindles, a head carried by each spindle to rotate therewith, and a cleaning member slidably mounted in each head and projecting from the head to engage the pan being cleaned at both sides, together with means for resiliently mounting each head on its spindle head.

In testimony whereof I have hereunto signed my name.

ALRID B. PEFFER.